United States Patent
Choi

(10) Patent No.: US 9,563,957 B1
(45) Date of Patent: Feb. 7, 2017

(54) 2D/3D IMAGE SCANNING AND COMPOSITING

(71) Applicant: YesVideo, Inc., Santa Clara, CA (US)

(72) Inventor: Andrew Chung-Kay Choi, Palo Alto, CA (US)

(73) Assignee: YesVideo, Inc., Santa Clara, CA (US)

( * ) Notice: Subject to any disclaimer, the term of this patent is extended or adjusted under 35 U.S.C. 154(b) by 0 days.

(21) Appl. No.: 14/791,087

(22) Filed: Jul. 2, 2015

(51) Int. Cl.
| | |
|---|---|
| H04N 13/00 | (2006.01) |
| G06T 7/00 | (2006.01) |
| H04N 13/02 | (2006.01) |

(52) U.S. Cl.
CPC ......... *G06T 7/0073* (2013.01); *H04N 13/0018* (2013.01); *H04N 13/0214* (2013.01)

(58) Field of Classification Search
CPC ............... G08B 13/246; G08B 13/2411; G08B 13/2474; G08B 13/242; Y10S 209/922; G01M 15/02; G01M 15/14; G01C 15/002; G07G 1/0054; G07G 3/003; G07G 1/0036; G01J 3/50; G01J 3/508; G01Q 10/00
USPC ............... 382/154, 145, 106, 141, 104, 107, 111,382/124, 144, 147, 285; 348/46, 47, 48, 82, 348/E13.074, E5.024, E7.085, 139, 207.99, 348/262, 43, 592, 77, 79, 94; 250/205, 559.22, 250/559.23; 358/474, 1.18, 408, 475
See application file for complete search history.

(56) References Cited

U.S. PATENT DOCUMENTS

| | | | |
|---|---|---|---|
| 6,154,288 A * | 11/2000 | Watanabe | H04N 1/4074 358/1.9 |
| 6,370,417 B1 | 4/2002 | Horbaschek et al. | |
| 7,184,047 B1 * | 2/2007 | Crampton | G06T 17/00 345/473 |
| 7,315,241 B1 * | 1/2008 | Daily | G02B 27/01 340/332 |
| 7,353,954 B1 * | 4/2008 | Malek | B07C 5/3404 198/400 |
| 8,224,064 B1 * | 7/2012 | Hassebrook | G01B 11/2513 345/585 |
| 8,953,854 B2 * | 2/2015 | Kumar | G06K 9/00087 382/124 |
| 2004/0151345 A1 * | 8/2004 | Morcom | G01S 7/487 382/104 |
| 2006/0170960 A1 | 8/2006 | Koike | |
| 2007/0061814 A1 * | 3/2007 | Choi | H04L 12/581 719/313 |
| 2008/0256443 A1 * | 10/2008 | Li | G06F 3/0486 715/700 |
| 2009/0021798 A1 * | 1/2009 | Abahri | H04N 1/195 358/474 |

(Continued)

*Primary Examiner* — Negussie Worku
(74) *Attorney, Agent, or Firm* — Fish & Richardson P.C.

(57) ABSTRACT

Methods, systems, and apparatus include computer programs encoded on a computer-readable storage medium, including a method for processing images. A structure provides a light sources configured to illuminate a target area. Illumination is controlled in a sequence over a first time period. At a given point in time, light sources are powered to enable illumination of the target area. An image of a target object is captured from a single reference location. The captured image is evaluated including processing the evaluated images on a pixel by pixel basis to produce a single composite image having respective pixel values derived from the evaluated captured images. The target object is 3D scanned to determine height information for a surface of a target on the target area. The height information is used to flatten respective pixels of the composite image.

(Continued)

The composite image is provided after the flattening of the respective pixels.

32 Claims, 4 Drawing Sheets

(56) References Cited

U.S. PATENT DOCUMENTS

| | | | |
|---|---|---|---|
| 2011/0222757 A1* | 9/2011 | Yeatman, Jr. | G06T 7/0075 |
| | | | 382/154 |
| 2012/0269404 A1* | 10/2012 | Hassebrook | G01B 11/2513 |
| | | | 382/115 |
| 2014/0344061 A1* | 11/2014 | Choi | G06Q 30/0267 |
| | | | 705/14.64 |
| 2014/0364743 A1* | 12/2014 | Godavarty | A61B 5/0071 |
| | | | 600/473 |
| 2015/0201892 A1 | 7/2015 | Hummel et al. | |
| 2015/0271483 A1 | 9/2015 | Sun et al. | |
| 2015/0366442 A1 | 12/2015 | Amling et al. | |
| 2016/0005192 A1 | 1/2016 | Royalty et al. | |
| 2016/0040976 A1* | 2/2016 | Berkeley | G01N 21/359 |
| | | | 356/479 |
| 2016/0163091 A1 | 6/2016 | Wang et al. | |
| 2016/0191903 A1 | 6/2016 | Zhang et al. | |

* cited by examiner

```
                                    200

┌──────────────────────────────────────────────────────────────────┐
    │ Provide a structure including a plurality of light sources, each │
    │ light source being disposed on the structure and being           │
    │ configured to illuminate a target area in proximity to the       │
    │ structure                                                    202 │
    └──────────────────────────────────────────────────────────────────┘
                                      │
                                      ▼
    ┌──────────────────────────────────────────────────────────────────┐
    │ Control illumination of the plurality of light sources in a      │
    │ sequence over a first time period, wherein at a given point in   │
    │ time in the sequence, one or more of the plurality of light      │
    │ sources are powered to enable illumination of the target area    │
    │ by powered ones of the plurality of light sources            204 │
    └──────────────────────────────────────────────────────────────────┘
                                      │
                                      ▼
    ┌──────────────────────────────────────────────────────────────────┐
    │ Capture, from a single reference location, an image of a target  │
    │ object that is located in the target area at each point in time  │
    │ in the sequence                                              206 │
    └──────────────────────────────────────────────────────────────────┘
                                      │
                                      ▼
    ┌──────────────────────────────────────────────────────────────────┐
    │ Evaluate the captured images including processing the evaluated  │
    │ images on a pixel-by-pixel basis to produce a single composite   │
    │ image having respective pixel values derived from the evaluated  │
    │ captured images                                              208 │
    └──────────────────────────────────────────────────────────────────┘
                                      │
                                      ▼
    ┌──────────────────────────────────────────────────────────────────┐
    │ 3D scan the target object to determine height information for a  │
    │ surface of a target on the target area for one or more pixels    │
    │ associated with the composite image                          210 │
    └──────────────────────────────────────────────────────────────────┘
                                      │
                                      ▼
    ┌──────────────────────────────────────────────────────────────────┐
    │ Use the height information to flatten respective pixels of the   │
    │ composite image                                              212 │
    └──────────────────────────────────────────────────────────────────┘
                                      │
                                      ▼
    ┌──────────────────────────────────────────────────────────────────┐
    │ Provide, as an output, the composite image after the flattening  │
    │ of the respective pixels                                     214 │
    └──────────────────────────────────────────────────────────────────┘
```

FIG. 2

2D/3D IMAGE SCANNING AND COMPOSITING

BACKGROUND

This specification relates to image processing.

Images can be obtained from different sources, such as by obtaining (e.g., capturing) an image with a camera. Various ways can be used to obtain an image, such as using a desktop scanner, taking a photograph using a digital camera, or providing analog documents to a service that can scan the documents and provide digital images.

Image quality can depend on various factors. For example, the number, quality and angle of light sources can produce shadows that may produce less than desirable image quality. Further, features of a given subject may affect the quality (producing artifacts or distortion) of a two-dimensional (2D) image that is ultimately produced.

SUMMARY

In general, one innovative aspect of the subject matter described in this specification can be implemented in methods that include a computer-implemented method for capturing images. The method includes providing a structure including a plurality of light sources, each light source being disposed on the structure and being configured to illuminate a target area in proximity to the structure. The method further includes controlling illumination of the plurality of light sources in a sequence over a first time period, wherein at a given point in time in the sequence, one or more of the plurality of light sources are powered to enable illumination of the target area by powered ones of the plurality of light sources. The method further includes capturing, from a single reference location, an image of a target object that is located in the target area at each point in time in the sequence. The method further includes evaluating the captured images including processing the evaluated images, for example, on a pixel by pixel basis, to produce a single composite image having respective pixel values derived from the evaluated captured images. In some implementations, the method further includes 3D scanning the target object to determine height information for a surface of a target on the target area for one or more pixels associated with the composite image. The method further includes using the height information to flatten respective pixels of the composite image. The method further includes providing, as an output, the composite image after the flattening of the respective pixels.

These and other implementations can each optionally include one or more of the following features. The method can further include calibrating the illumination including backing out discontinuities in lighting of the target area. The method can further include inserting a page into the target area, the page representing the target object. The page can be included in an album and wherein inserting includes inserting the album turned to the page. The plurality of light sources can include four or more spatially separated light sources. Evaluating the captured images can include evaluating for each pixel each captured image, determining one or more pixel values from the captured images to use in the composite image and determining a composite image pixel value for a respective pixel based on the determined one or more pixel values. Evaluating can include for each pixel, filtering out a portion of the pixel values for one or more of the captured images and not using the filtered out portion in computing the determined composite image pixel value. Filtering out can include filtering out one or more lightest and/or one or more darkest pixel values. Evaluating can include applying a mathematical function to pixel values from captured images. The mathematical function can be selected from the group comprising a mathematical mean or median. Evaluating the captured images can include normalizing each captured image with respect to the calibration prior to further processing. 3D scanning can include determining a point cloud associated with the target area including height information and defining a Bezier curve to define a surface associated with the target area, and using the defined surface to develop the height information. The structure can be portable. Evaluating the captured images can include applying a filter to each captured image.

In general, another innovative aspect of the subject matter described in this specification can be implemented in computer program products that include a computer program product tangibly embodied in a computer-readable storage device and comprising instructions. The instructions, when executed by one or more processors, cause the processor to: provide a plurality of light sources, each light source being disposed on a structure and being configured to illuminate a target area in proximity to the structure; controlling illumination of the plurality of light sources in a sequence over a first time period, wherein at a given point in time in the sequence, one or more of the plurality of light sources are powered to enable illumination of the target area by powered ones of the plurality of light sources; capture, from a single reference location, an image of a target object that is located in the target area at each point in time in the sequence; evaluate the captured images including processing the evaluated images on a pixel by pixel basis to produce a single composite image having respective pixel values derived from the evaluated captured images; optionally 3D scan the target object to determine height information for a surface of a target on the target area for one or more pixels associated with the composite image including using the height information to flatten respective pixels of the composite image; and provide, as an output, the composite image.

In general, another innovative aspect of the subject matter described in this specification can be implemented in systems, including a system comprising one or more processors and one or more memory elements including instructions. The system can include a structure, a plurality of light sources and means for powering the light sources. The instructions, when executed, cause the one or more processors to: illuminate a target area in proximity to the structure; control illumination of the plurality of light sources in a sequence over a first time period, wherein at a given point in time in the sequence, one or more of the plurality of light sources are powered to enable illumination of the target area by powered ones of the plurality of light sources; capture, from a single reference location, an image of a target object that is located in the target area at each point in time in the sequence; evaluate the captured images including processing the evaluated images on a pixel by pixel basis to produce a single composite image having respective pixel values derived from the evaluated captured images; optionally 3D scan the target object to determine height information for a surface of a target on the target area for one or more pixels associated with the composite image and use the height information to flatten respective pixels of the composite image; and provide, as an output, the composite image.

In general, another innovative aspect of the subject matter described in this specification can be implemented in a computer-implemented method for capturing images. The method includes providing a structure including a plurality of light sources, each light source being disposed on the structure and being configured to illuminate a target area in proximity to the structure. The method further includes capturing one or more calibration images of the target area including illuminating the target area with one or more of the plurality of light sources and capturing the one or more calibration images coincident with the illuminating. The method further includes receiving an indication that a target item has been placed in the target area and thereafter controlling illumination of the plurality of light sources in a sequence over a first time period, wherein at a given point in time in the sequence, one or more of the plurality of light sources are powered to enable illumination of the target area by powered ones of the plurality of light sources. The method further includes capturing, from a single reference location, an image of a target object that is located in the target area at each point in time in the sequence. The method further includes calibrating one or more of the captured images including backing out discontinuities in lighting of the target area. The method further includes evaluating the captured images including processing the evaluated images on a pixel by pixel basis to produce a single composite image having respective pixel values derived from the evaluated captured images. The method further includes providing, as an output, the composite image.

These and other implementations can each optionally include one or more of the following features. Backing out discontinuities can include multiplying each captured image by a normalization image based on the corresponding calibration image. The normalization image can be created by dividing each pixel value of the calibration image by the calibration image's maximum pixel value. The maximum pixel value can be evaluated based on luminosity.

In general, another innovative aspect of the subject matter described in this specification can be implemented in a system comprising one or more processors and one or more memory elements including instructions. The instructions can include providing an enclosure including a plurality of light sources, each light source being disposed on the structure and being configured to illuminate a target area in proximity to the structure, the enclosure including a frame and a screening cloak, the screening cloak including a port for enabling capture of an image by a camera disposed on the structure at the port. The system can include a controller for providing power and control for the plurality of light sources. The system can further include an application for receiving an indication that a target item has been placed in the target area and thereafter controlling illumination of the plurality of light sources in a sequence over a first time period, wherein at a given point in time in the sequence, one or more of the plurality of light sources are powered to enable illumination of the target area by powered ones of the plurality of light sources. The application can further be configured to capture, from a single reference location, an image of a target object that is located in the target area at each point in time in the sequence, evaluate the captured images including processing the evaluated images on a pixel by pixel basis to produce a single composite image having respective pixel values derived from the evaluated captured images and provide as an output, the composite image. The screening cloak can be configured to extend over the frame to a base location so as to block ambient light from illuminating the target area. The frame can include adjustable height legs for adjusting a height of the port over the target area. The frame can be sized to receive a single page of a photo album in the targeting area. The frame can be sized to receive an entire photo album but only illuminates and captures images one page at a time. The application can execute in part on a mobile device that is separate from the enclosure and controller. The screening cloak can include a pad for positioning the mobile device to enable image capture through the port.

Particular implementations may realize none, one or more of the following advantages. A portable, low cost image capture system is proposed that allows for easy, quick and high quality image capture of content. Image capture (such as for the purposes of digitization of objects, including albums, photos and books), can be done at home with a user's own cellphone based camera. Image capture can be completed without a user having to relinquish or mail off their objects or content. Users can receive and review a final product immediately and not be required to wait substantial amounts of time between image capture and production of a final product. Costly commercial approaches, e.g., using large scanners and other complex technology, can be avoided. The equipment used for image capture can be extremely portable.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for 2D- and 3D-image capture, scanning and compositing.

Like reference numbers and designations in the various drawings indicate like elements.

DETAILED DESCRIPTION

Systems, methods, and computer program products are described for image capture and compositing. The quality of a finished product, such as an image, can depend on techniques that are used. For example, capturing content from photo albums and scrapbooks can be challenging because of glare and page warping of the source material (e.g., pages/objects being imaged). Traditional approaches may use, for example, large book scanners (e.g., from commercial offerings) that address challenges mechanically, such as using a book cradle, a glass plate, and careful light position. However, these approaches can be expensive and non-portable.

In some implementations, techniques can use a portable, high-image quality, low-cost image capture system. For example, the techniques proposed can be used for media that are prone to lighting artifacts having uneven lighting, reflections, and/or shadows. Media of this type can include, for example, photo albums, scrapbooks, loose photos, framed images, large artwork hanging on wall. Such techniques can be, for example, part of a business model that allows image capture and processing without requiring a customer to part with their media, including providing an end product on the spot.

In some implementations, lighting can be provided and compensated for so as to minimize the effects of shadowing, glare or other light induced artifacts. For example, in some implementations, for a given target object (e.g., a page of content from an album), an image can be captured for each light source (e.g., referred to as page capture). Each page image can be normalized against a reference image (e.g., an image of the target area without the content that can be used to set/adjust for lighting artifacts). A composite of the normalized images or portions of the normalized images can be created (e.g., referred to as a composite page image). In some implementations, the compositing is performed pixel by pixel. Alternatively, surrounding pixels can be used in the compositing. In some implementations, the compositing is performed using less than all of the captured page images. Details of the image capture and processing are discussed in greater detail below.

Figure 1A:
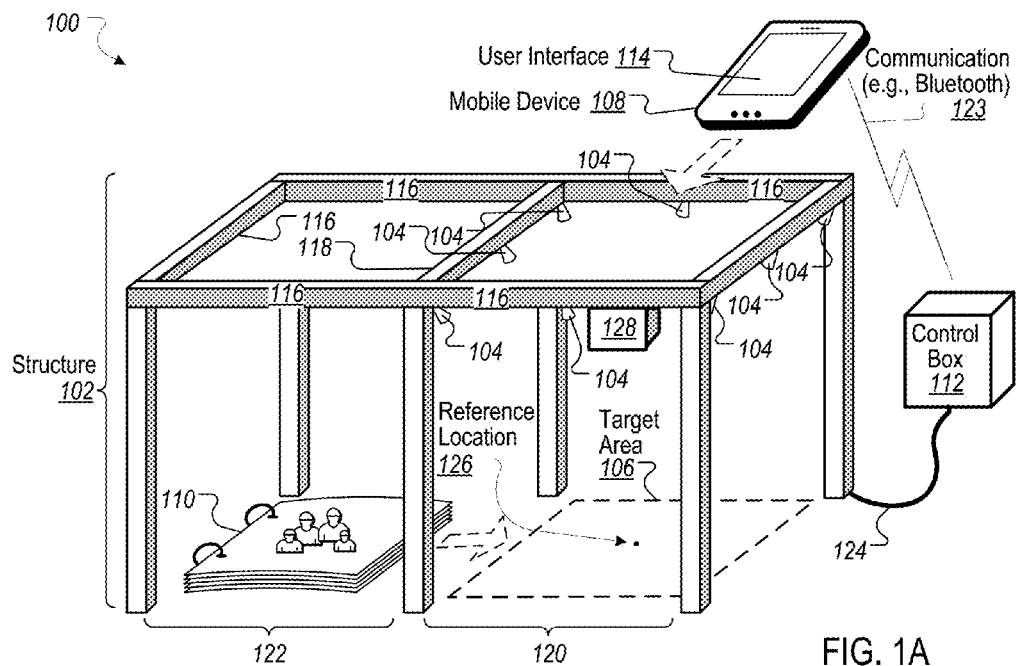
FIGS. 1A-1C collectively show an example environment for two- and three-dimensional image capturing, scanning and compositing.
Figure 1B:
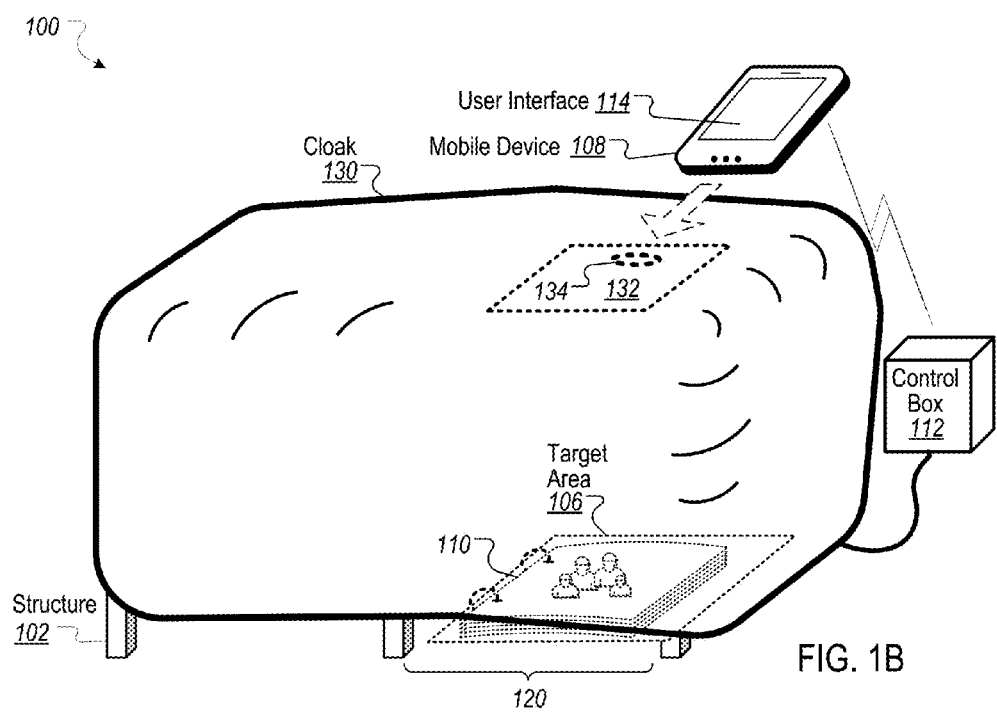
Figure 1C:
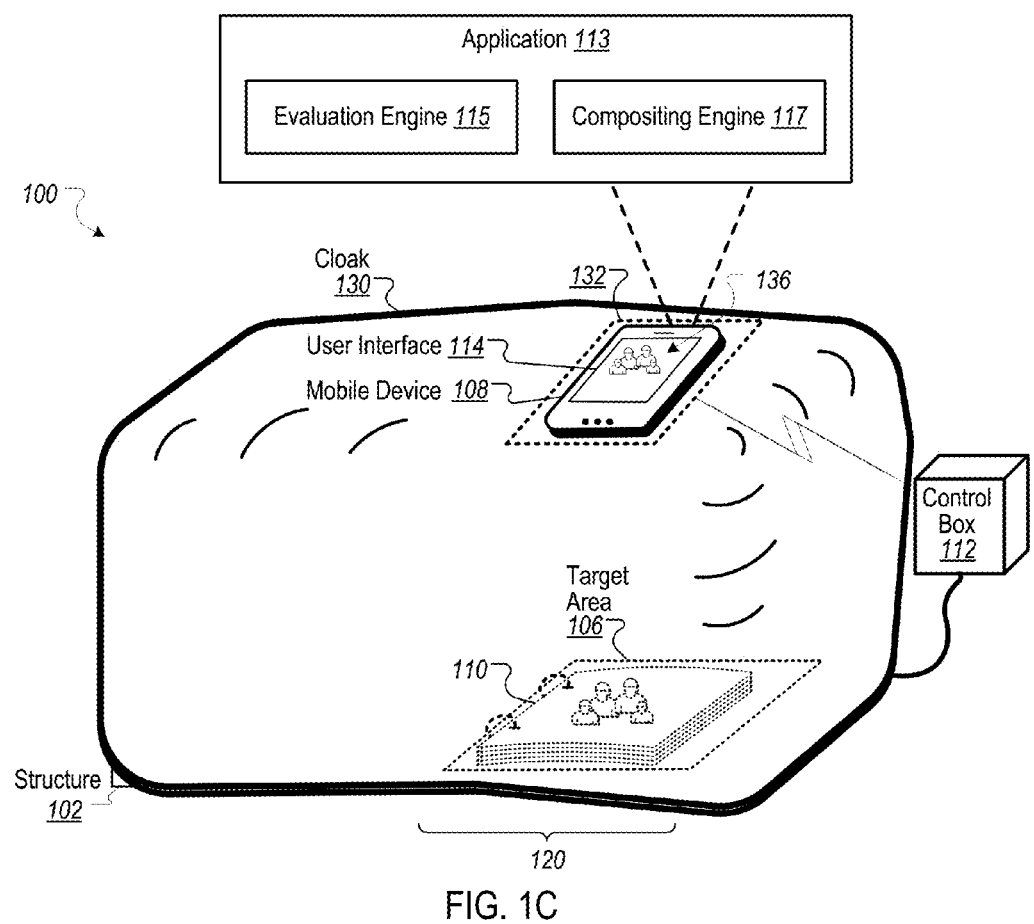

FIGS. 1A-1C collectively show an example environment 100 for two- and three-dimensional image capture and compositing. Referring to FIG. 1A, for example, scanning and compositing can be done using a structure 102 and the structure's components, including a plurality of light sources 104 mounted on the structure 102. Each light source 104, when aimed at a target area 106, can be configured to illuminate the target area 106 in proximity to (e.g., below) a portion of the structure 102.

In some implementations, different approaches for lighting sources can be used. For example, lighting sources can be directional and placed in different locations, such as evenly spaced around the perimeter of the area to be imaged. Directionality of light can be maximized, for example, using filters. With a larger number of effective lighting sources, lighting artifacts from any individual source can more easily be removed in compositing, since artifacts from each image may comprise a smaller percentage of the combined image data. A single lighting device (e.g., LED, bulb, etc.) can produce multiple effective lighting sources. For example, multiple effective lighting sources can be produced by physically moving lighting sources, by reflecting off one or more mirrors (e.g., that are movable), or by using a combination of techniques.

In some implementations, a configuration can include, for example, a single LED centered above the scan area and pointed outward, reflecting off a ring of mirrors surrounding the scan area. In some implementations, a given number of lighting devices can also produce a larger number of effective lighting sources by using the lighting devices in combinations. For example, combination can include using two LEDs in two locations, the effective light from one LED or the other LED, or the combination of both LEDs.

Referring again to FIG. 1A, a mobile device 108 (e.g., a mobile phone with a camera) can be suspended by the structure 102 over the target area 106, such as with the camera lens is positioned/aimed at the target area 106. When in place, the mobile device 108 can capture images in coordination with illumination events provided by the light sources 104. The mobile device 108, for example, can be used for both imaging and controlling a controller associated with structure 102, e.g., by use of a control box 112 (described below). For example, an application 113 on the mobile device 108, while in communication with control box 112, can be used to request image capture, perform image capture in coordination with illumination by the light sources 104, process captured images, and present composite images (or individual images) to the user, e.g., in a user interface (UI) 114. Image capture can occur, for example, when initiated by the user, such as after an object (e.g., a photo album 110) is placed in the target area 106.

As shown, eight light sources 104 are provided by the structure 102, e.g., along bottom edges of a top frame 116 of the structure 102, including along bottom edges of a cross piece 118. For example, the cross piece 118 can span a space between parallel long portions of the top frame 116, such as along a boundary between a target half 120 and a non-target half 122 of the structure 102. As such, the light sources 104 can be arranged in a rectangle, such as with light sources 104 at each of the corners and substantially near the centers of the edges of the rectangle. Other arrangements and numbers of light sources 104 are possible. Although eight light sources 104 are shown in FIG. 1A, any suitable number of light sources can be used (e.g., four or more).

In some implementations, image capture and compositing performed using the structure 102 can include coordinated actions performed by the control box 112 and the mobile device 108. The mobile device 108, for example, can capture images, e.g., when instructed by an application 113 running on the mobile device 108. Similarly, the control box 112 can be instructed by the application 113 on the mobile device as to the time, sequence of illumination events in order to capture each particular image. While reference is made of communications in a certain direction and by instructions issued by the application 113, the intelligence for controlling illumination and image capture can be located elsewhere, such as in the control box 112. Communication 123 between the mobile device 108 and the control box 112 can be facilitated using Bluetooth communication or other techniques (e.g., near field communication (NFC), a wired connection, etc.). Coordination by the control box 112 and communication with the mobile device 108 can be timed, for example, to coincide with the operation of the light sources 104. As such, the mobile device 108 can be automatically instructed to capture plural images in rapid succession during a sequence of strobe flashes by various ones of the light sources 104.

The control box 112 can provide power to the components of the structure 102, e.g., including providing power for the light sources 104. For example, one or more wires 124 can connect the control box 112 to the structure 102, with wiring (not shown) running inside the structure and connecting the light sources 104. The control box 112 can receive power from an external power source, such as using direct current (e.g., using a plug, not shown), batteries, solar, or other energy sources.

In some implementations, the mobile device 108 can be emulated (or equivalent capabilities achieved) using a mobile or non-mobile device with an imaging attachment that interfaces with the structure. For example, a USB attachment attached to a laptop computer and capable of capturing images can be used in place of the mobile device 108. Other architectures are possible.

The control box 112 can control illumination of the target area using the plurality of light sources 104 such as in accordance with a predetermined, optimized, randomized or manual sequence over a first time period, such as in a time period of a few seconds. For example, at a given point in time in the sequence, one or more of light sources 104 can be powered to light the target area 106. The sequence can include, for example, a series of light flashes from the light sources 104, the flashes timed to permit an image to be captured during a respective flash.

A single reference location 126 can be defined, e.g., in the center of the target area 106. From (and in accordance with) the single reference location 126, a plurality of images can be captured of a target object (e.g., a page of the photo album 110) located in the target area 106, e.g., at each point in time in the sequence. For example, a page of the photo album 110 can be placed in the target area 106, such as slid or otherwise placed over the target area 106. The target area 106, for example, can be a region of a substantially flat surface (e.g., a table top) on which the structure 102 stands.

An evaluation engine 115 (See FIG. 1C), for example included in the application 113 on the mobile device 108, can be used to evaluate the captured images. The evaluating can include processing the evaluated images on, for example, a pixel-by-pixel basis to produce one or more (e.g., a single) composite image having respective pixel values derived from the evaluated captured images.

In some implementations, a 3D scanner 128 can be mounted on the structure 102, such as along a bottom edge of the top frame 116 or along the bottom of the cross piece 118. The 3D scanner 128, for example, can perform 3D scanning of the target object to determine height information for a surface of a target in the target area for one or more pixels associated with the composite image. For example, the 3D scanner 128 can perform a 3D scan of a non-flat surface, such as a slightly bent and/or uneven page of the photo album 110. Uneven pages can also be caused by objects placed on the pages, such as stickers or mementos. In some implementations, more than one 3D scanner 128 can be used.

A compositing engine 117 (See FIG. 1C), for example included in the application 113 on the mobile device 108, can use the height information obtained by one or more 3D scans to flatten respective pixels of the composite image. For example, captured images can be evaluated on a pixel-by-pixel basis to produce a single composite image. The single composite image can have respective pixel values derived from the evaluated captured images, as described above. In some implementations, various ways can be used to flatten a pixel value based on height information from a 3D image. For example, a 3D scan can produce a point cloud that defines a mesh surface. Mathematically the mesh surface can be a Bezier surface in which each point in the 3D scan point cloud is a control point in the surface. The original non-flattened composition image can be mapped to this mesh surface. Then, the mesh can be deformed so that any control point whose height is non-zero is transformed to zero. The mapped image can then be projected back to two dimensions (e.g., since all heights are now zero, projecting to two dimensions is equivalent to just dropping the z dimension), and the flattened image can be provided. The generation of a mesh surface, the mapping of the image to that mesh surface, the deformation of the mesh, and the projection back to two dimensions are all commonly known mathematical algorithms and can be handled in software using existing transformation libraries.

After the flattening of the respective pixels, the application 113 can provide the composite image as an output. For example, the composite image can be displayed in the UI of the mobile device and/or provided as an output to another device/system (e.g., for storage on a USB device, for inclusion in an album, or for transfer to another party or system).

Referring to FIG. 1B, a cloak 130 can be provided to, for example, block out ambient light. In some implementations, the cloak 130 substantially covers the entire structure 102. In some implementations the cloak 130 only covers a portion of the structure 102, such as a portion associated with the target area 106. The cloak 130 can be used to cover the structure 102 and underlying components and objects, for example, when image capture is to occur. The cloak 130 can prevent light from sources outside the structure 102 from influencing image capture. The cloak 130 can help ensure predictable lighting provided by the light sources 104 during image capture. The cloak 130 can be made of cloth or other suitable material(s) that provide easy and efficient covering of the structure and object (e.g., the photo album 110) being imaged.

The cloak 130 can include a pad 132 upon which the mobile device 108 can rest, e.g., in a fixed position, during image capture. The pad 132 can include an opening 134, e.g., adjustable for (or customized to) a particular device type of the mobile device 108. For example, the structure 102 can include a pad 132 with an opening 134 that conforms to the aperture location on the user's mobile device 108. In some implementations, a saleable kit includes the structure 102, the control box 112 and an attachable (to the cloak 130) pad template that matches the device type specified by the user. Other manufacturing, shapes and/or configurations of the cloak 130 and its components are possible.

In some implementations, the opening 134 can be in the center of the pad 132. In some implementations, the cloak 130 can include spacing/positioning mechanisms that help insure that the opening 134 is directly over the center of the target area 106, such as using loop hooks or other fasteners to fix the cloak 130 to the top frame 116. Post processing of images can be used to account for irregular placement of the opening 134 relative to the target area 106.

In some implementations, during use, the cloak 130 can be entirely or partially re-positioned for/after each imaging session. The repositioning can include, for example, repositioning the cloak to enable moving a different object (e.g., another page of the photo album 110, or some other object to be scanned) into the target area 106, then replacing the cloak. In some implementations, the cloak 130 can include a front flap or other portions that enable fast and simple access to the target area 106, enabling rapid re-deployment of the cloak 130.

Referring to FIG. 1C, the cloak 130 is shown in a completely deployed position, e.g., shading outside lighting from sources outside the structure 102. Further, the mobile device 108 is shown in position on the cloak 130, e.g., with an aperture of the device's camera over the opening 134. In this position, for example, image capture can occur.

As an example, the user can initiate image capture using the user interface. Upon determining that image capture is to begin, the application 113 can communicate with the control box 112. The control box 112 can send a series of commands to both the light sources 104 and the mobile device 108 to capture plural images, using coordinated timing between the light sources 104 and the mobile device 108. After processing of the images (as described above), a resulting composite image 136 can be displayed in the UI 114 for presentation to the user.

In some implementations, image capture can be initiated in various ways, such as by voice commands or the use of a remote control or other attachment that communicates with the mobile device 108 or the control box 112, or both. In some implementations, image capture can be initiated upon user selection of a control in the UI 114, and after a delay of a few seconds (to allow any movement of the cloak 130 and positioning of the camera), image capture can begin. Other ways of initiating image capture are possible.

FIG. 2 is a flowchart of an example process 200 for 2D- and 3D-imaging and compositing. In some implementations, components of the system 100 can perform steps of the process 200 using instructions that are executed by one or more processors. FIGS. 1A-1C are used to provide example structures for performing the steps of the process 200.

A structure is provided that includes a plurality of light sources (202). Each light source is disposed on the structure, and each light source is configured to illuminate a target area in proximity to the structure. For example, the structure 102 includes light sources 104, as described above, and each light source 104 is directed to the target area 106.

In some implementations, the plurality of light sources can include four or more spatially separated light sources. For example, as shown in FIG. 1A, there are eight light sources 104.

In some implementations, the structure is portable. For example, the structure can be moved to any room of a home or workplace, can be easily collapsed or disassembled and transported.

Illumination of the plurality of light sources is controlled in a sequence over a first time period (204). For example, at a given point in time in the sequence, one or more of the plurality of light sources are powered to enable illumination of the target area by powered ones of the plurality of light sources. For example, during image capture, the control box 112 can instruct the mobile device 108 to capture images coincident with powering, in sequence, individual ones or groups of the lighting sources 104.

An image of a target object, located in the target area, is captured from a single reference location at each point in time in the sequence (206). For example, the mobile device 108 can capture individual images relative to the single reference location 126.

In some implementations, the process 200 further includes inserting a page into the target area, the page representing the target object. For example, a page can be positioned in the target area 106 for imaging. The page can be exposed for imaging, for example, by turning to the particular page in the photo album 110.

The captured images are evaluated including processing the evaluated images on, for example, a pixel-by-pixel basis to produce a single composite image (208). The single composite image has respective pixel values derived from the evaluated captured images. For example, the composite image 136, created by the compositing engine 117, can be produced from single images of the photo album page in the target area 106. In some implementations, evaluating the captured images can include applying a filter to each captured image.

In some implementations, a filter may be applied to the captured images prior to evaluation. For example, a Sobel filter may be used, which transforms the captured images to gradients which may be used in subsequent evaluation.

In some implementations, evaluating the captured images includes evaluating for each pixel of each captured image, determining one or more pixel values from the captured images to use in the composite image and determining a composite image pixel value for a respective pixel based on the determined one or more pixel values. For example, the evaluation engine 115 can evaluate each of the captured images and decide which pixels are to be included in the single composite image, as described below. In some implementations, other techniques for compositing multiple images can be used. For example, the gradient field can be obtained from each image (such as by applying a Sobel filter), a median of the input gradient fields can be determined, and the median gradient field can be inverted back to the original pixel space, e.g., using various numerical approaches. In some implementations, other approaches can be used, e.g., to transform each of the input images to another domain, to apply a mathematical function to the set of images in the secondary domain, and to transform the result back to the original domain.

In some implementations, evaluating includes for each pixel, filtering out a portion of the pixel values for one or more of the captured images and not using the filtered out portion in computing the determined composite image pixel value. For example, filtering out a portion of the pixel values for one or more of the captured images can includes filtering out one or more lightest and one or more darkest pixel values, as described below.

In some implementations, evaluating includes applying a mathematical function to remaining pixel values from captured images not included in the filtered out portion. For example, a mathematical function, such as a mathematical mean or median, can be applied to the remaining (e.g., not filtered-out) pixel values to determine the composite image. In some implementations, including the application of a mathematical function does not require pre-filtering (e.g., pre-filtering can be optional).

In some implementations, evaluating includes applying a mathematical function or algorithm against a plurality of pixels from each captured image to determine the value of each pixel in the composite image.

In some implementations, evaluating the captured images includes normalizing each captured image with respect to the illumination calibration prior to further processing. For example, normalization of an image can include compensation for uneven lighting and other normalization techniques, as described below.

In some implementations, the target object is three-dimensionally scanned to determine height information for a surface of a target on the target area for one or more pixels associated with the composite image (210). For example, the 3D scanner 128 can perform a 3D scan of the exposed page of the photo album 110.

In some implementations, 3D scanning includes determining a point cloud associated with the target area including height information and defining a Bezier curve to define a surface associated with the target area, and using the defined surface to develop the height information. For example, to define a Bezier curve for a particular 3D scan, a series of four distinct points can be converted to a cubic Bezier curve that intersects the four distinct points. Other point cloud and curve techniques can be used.

The height information is used to flatten respective pixels of the composite image (212). For example, the compositing engine 117 can use techniques described below to flatten pixels in the composite image 136.

The composite image is provided as an output after the flattening of the respective pixels (214). For example, the composite image 136 can be provided by the application 113 for display in the UI 114.

In some implementations, the process 200 further includes calibrating the illumination including backing out discontinuities in lighting of the target area. For example, the application 113 can include a monitoring function that can make adjustments to the light sources 104 to correct for recurring discontinuities in lighting over time. Other calibrations can include, for example, changing the length of time that lighting occurs for a particular light source 104, the aperture setting on the camera, and/or other calibration changes. In some implementations, calibrating the illumination can include changing or recommending a distance of the mobile device 108 to an object being imaged. In some implementations, the structure 102 can include mechanisms for changing the height of an object placed in the target area 106, e.g., so that an exposed page of the photo album 110 is generally at a stable height relative to the camera.

In some implementations, each image can be normalized (e.g., prior to further processing) to compensate for uneven lighting (e.g., lux variations across the image). For example, a reference image can be captured of a uniform background (e.g., planar, single color, single texture). The page image can be captured using various capture parameters, e.g., exposure, shutter speed, aperture setting, and white balance. If lighting is even, for example, then the reference image should have a same value for all pixels.

In some implementations, to compensate for uneven lighting, the following procedure can be used. A 2×2 normalization matrix is created based on the reference image, where the matrix width and height are the same as the reference image. The maximum pixel value of the reference image is determined (i.e., the value of the pixel from the reference image with the maximum value based on one of the evaluation methods described below). The value of each cell of the normalization matrix is the value of the corresponding pixel from the reference image divided by the maximum pixel value previously determined. Finally, uneven lighting in the captured image can be compensated for by multiplying pixel-wise the captured image by the normalization matrix. The resulting image is referred to as the normalized image. The maximum pixel value, for example, can be dependent on a mean maximum lightness, e.g., the L in hue, saturation, light (HSL). In a red, green, blue (RGB) representation, assuming the reference image is white, the pixel can be selected based on the maximum value of any single channel (R, G, or B). Thereafter, the system can use the values of all channels for the selected pixel. This technique can be used, for example, instead of finding the maximum value of each channel independently, which can result in a color shift in the normalized image. Finally, each page capture can be multiplied by the normalization image to create the normalized page capture.

In some implementations, creating the composite of the normalized images can include using composite multiple images to remove directional lighting artifacts (e.g., glare and shadows). Various approaches of compositing can be used. In a simple median approach, for example, two middle images can be averaged for an even number of images. In a discarded-outliers approach, for example, outliers can be discarded, and the remaining images can be averaged. For example, for each pixel, values can be sorted, and the top 25% and bottom 25% can be discarded, and the remaining 50% averaged. In another approach, for example, outliers can be discarded based on a fixed maximum value difference from the average or based on a fixed maximum standard deviation from the average. In another approach, for example, glare/shadows can be detected based on differences from surrounding pixels, as compared to that in other images. For these compositing approaches and/or others, sorting can be based on, for example, the L value in HSL, or a single component value in RGB (e.g., rather than sorting each channel separately). In some implementations, an operator (or an end user) can influence the compositing process by explicitly identifying areas affected by glare/shadows. This can be useful, for example, if there are not enough lighting sources to remove all lighting artifacts.

In some implementations, de-warping techniques can be used in compositing images. For example, a page can be 3D-scanned and de-warped in software, given that page can be expected to be primarily planar. Exceptions can occur, e.g., for objects placed on the page, such as keepsakes or 3-dimensional objects (e.g., stickers). In some implementations, de-warping can be a separate, optional step after image compositing.

In some implementations, various scanning approaches (e.g., associated with de-warping) can include the use of stereo imaging (e.g., optionally with an infrared (IR) dot pattern) and the use of a positionable line laser. In some implementations, using the positionable line laser can use, for example, a rotary barcode scanner (e.g., using rotating mirrors) or a laser on a servo. Calibration of the positionable line laser, for example, can use an object of known size, so that system doesn't depend on an exact position/angle of the laser. Calibration can also be used, for example, to determine actual pixels per inch (PPI) and store in final image exchangeable image file format (EXIF) information.

Scanning using a positionable line laser can include various actions. For example, images of a line projected across a scan surface can be captured at various positions (e.g., with more distinct positions yielding higher resolution scans). During calibration, for example, for each scan, at least one side of the line can be required to project onto the scan background (e.g., not the page being scanned). During calibration, based on a known height of a calibration object and based on a difference in the position between the line projected on a calibration object and the line projected on the background, the plane defined by the laser projection can be determined. The determination can assume, for example, that the laser projection rotates around an axis; then given two images (with distinct laser positions), the line on which the laser resides can be determined. To 3D-scan a page, for example, one image can be captured for each calibration image (e.g., with matching laser positions). Matching laser positions can be determined, for example, either by a known servo position (in the case of controllable position) or by ensuring that the projected line reaches the scan background (on at least one side of the image). The calibration image can be determined with matching line position. For each scan image, given the known laser position and angle, for example, the height of the page can be determined at each point along the laser projection. In some implementations, a 3D scan image need not be the same resolution as the image scans, as differences can be accommodated by the de-warping process.

In some implementations, de-warping can include the following techniques. For example, using the 3D scan point cloud, a Bezier surface can be determined through the control points. For each pixel in the page scan, an affine transform can be performed on the pixel from the position mapped on the Bezier surface to the origin plane (e.g., same x/y coordinates, but z=0). In some implementations, to accommodate actual 3D objects on a page (e.g., raised stickers, keepsakes, etc.) versus curvature of the page itself, the 3D objects can be identified. The affine transform can then be adjusted accordingly (e.g., by transforming to the height of the object instead of to z=0). 3D objects can be identified, for example, by performing edge detection on an image. In some implementations, normal edge detection (e.g., based on a gradient filter) can be performed, and 3D objects can be identified based on edges coinciding with height changes from the 3D scan. In some implementations, edge detection sensitivity can optionally be controlled by an operator or an end user.

In some implementations, a 3D model and known lighting positions can be used to further normalize lighting. For example, reference image lighting may differ from page lighting, depending on light source position and page elevation. Normalizing page image based on reference image can be inaccurate, e.g., when the 3D surface of the page differs significantly in height or angle from that of the reference image background. The 3D model can compensate for these differences, since the expected brightness can be determined based on the surface angle and the distance from the light source, which can be inferred from the 3D model.

In some implementations, a remote trigger device can be used to avoid moving the camera (e.g. that is part of a mobile device) during imaging. For example, the remote trigger device can communicate with the mobile device either directly or through a control box.

In some implementations, automatic cropping can occur, e.g., based on an expectation that a page is rectangular, usually with a spine on one side, and captured against a known background. For example, automatic cropping can use edge detection on the image scan or a 3D scan, or use both sources to improve accuracy.

In some implementations, an application on a mobile device can be used to capture images from pages in an order that allows for faster processing of multiple scans. For example, the application can be designed to be able to capture even pages, then odd pages, and sort the captured pages for processing and/or presentation.

In some implementations, the application can support integrated billing. For example, scans can be billed automatically to a credit card, a user account, or some other billing/payment system.

In some implementations, the application can support integrated output of captured and composited images to physical storage (e.g., USB sticks, etc.), uploading to the cloud for viewing, sharing and customization, and/or allow a customer to use raw images to customize compositing and de-warping.

In some implementations, other processes can be used, including an additional process that is different from the process 200 for 2D- and 3D-imaging and compositing. In some implementations, components of the system 100 can perform steps of the additional process using instructions that are executed by one or more processors. In some implementations, FIGS. 1A-1C are used to provide example structures for performing the steps of the additional process. In some implementations, an additional system described below can be used for performing the following steps of the additional process.

A structure is provided that includes a plurality of light sources. For example, each light source can be disposed on the structure and can be configured to illuminate a target area in proximity to the structure.

One or more calibration images of the target area are captured. For example, the capturing can include illuminating the target area with one or more of the plurality of light sources and capturing the one or more calibration images coincident with the illuminating.

An indication is received that a target item has been placed in the target area. Thereafter, illumination of the plurality of light sources can be controlled in a sequence over a first time period. For example, at a given point in time in the sequence, one or more of the plurality of light sources can be powered to enable illumination of the target area by powered ones of the plurality of light sources.

An image of a target object is captured from a single reference location. For example, the image can be located in the target area at each point in time in the sequence.

One or more of the captured images are calibrated including backing out discontinuities in lighting of the target area. In some implementations, backing out discontinuities can include multiplying each captured image by a normalization image based on the corresponding calibration image. For example, the normalization image can be created by dividing each pixel value of the calibration image by the calibration image's maximum pixel value. In some implementations, the maximum pixel value can be evaluated based on luminosity.

The captured images are evaluated including processing the evaluated images on a pixel by pixel basis to produce a single composite image. For example, the single composite image can have respective pixel values derived from the evaluated captured images. The composite image is provided as an output.

In some implementations, the additional process can be implemented in the following system. For example, the system can provide an enclosure including a plurality of light sources, each light source being disposed on the structure and being configured to illuminate a target area in proximity to the structure. The enclosure can include a frame and a screening cloak, the screening cloak including a port for enabling capture of an image by a camera disposed on the structure at the port.

The system can include a controller for providing power and control for the plurality of light sources. The system can include an application for receiving an indication that a target item has been placed in the target area and thereafter controlling illumination of the plurality of light sources in a sequence over a first time period. For example, at a given point in time in the sequence, one or more of the plurality of light sources can be powered to enable illumination of the target area by powered ones of the plurality of light sources. The application can be further configured to capture, from a single reference location, an image of a target object that is located in the target area at each point in time in the sequence, evaluate the captured images including processing the evaluated images on a pixel by pixel basis to produce a single composite image having respective pixel values derived from the evaluated captured images and provide as an output, the composite image.

In some implementations, the screening cloak can include, for example, a pad for positioning the mobile device to enable image capture through the port. In some implementations, the screening cloak can be configured to extend over the frame to a base location so as to block ambient light from illuminating the target area. In some implementations, the frame can include adjustable height legs for adjusting a height of the port over the target area. In some implementations, the frame can be sized to receive a single page of a photo album in the targeting area. In some implementations, the frame can be sized to receive an entire photo album but only illuminates and captures images one page at a time. In some implementations, the application executes in part on a mobile device that is separate from the enclosure and controller.

Figure 3:
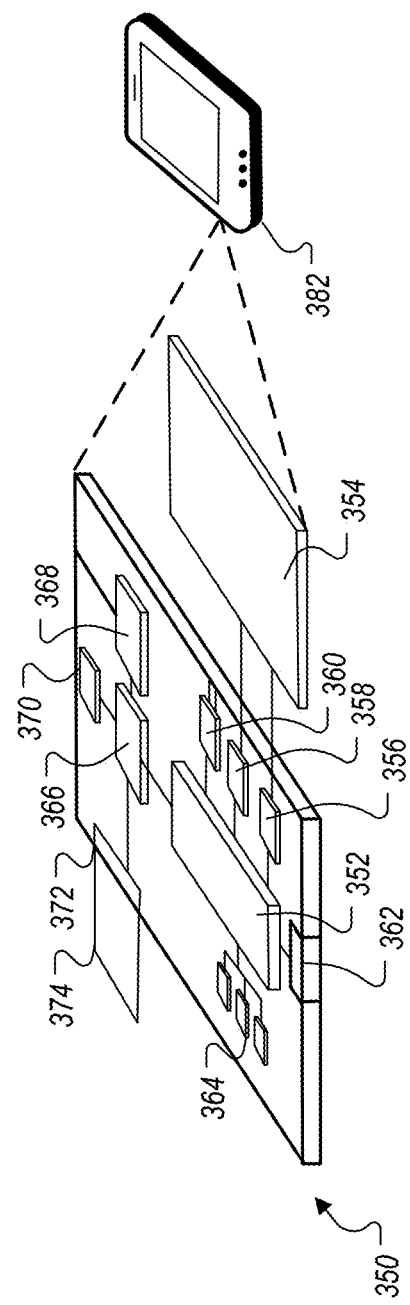
FIG. 3 is a block diagram of an example computer system that can be used to implement the methods, systems and processes described in this disclosure.

FIG. 3 is a block diagram of example computing device 350 that may be used to implement the systems and methods described in this document, as either a client or as a server or plurality of servers. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 350 includes a processor 352, memory 364, an input/output device such as a display 354, a communication interface 366, and a transceiver 368, among other components. The computing device 350 may also be provided with a storage device, such as a micro-drive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the computing device 350, such as control of user interfaces, applications run by computing device 350, and wireless communication by computing device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of computing device 350 with other devices. External interface 362 may provide, for example, for wired communication (e.g., via a docking procedure) or for wireless communication (e.g., via Bluetooth® or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to computing device 350 through expansion interface 372, which may include, for example, a subscriber identification module (SIM) card interface. Such expansion memory 374 may provide extra storage space for computing device 350, or may also store applications or other information for computing device 350. Specifically, expansion memory 374 may include instructions to carry out or supplement the processes described above, and may include secure information also. Thus, for example, expansion memory 374 may be provide as a security module for computing device 350, and may be programmed with instructions that permit secure use of computing device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368 (e.g., a radio-frequency transceiver). In addition, short-range communication may occur, such as using a Bluetooth®, WiFi, or other such transceiver (not shown). In addition, GPS receiver module 370 may provide additional wireless data to computing device 350, which may be used as appropriate by applications running on computing device 350.

Computing device 350 may also communicate audibly using audio codec 360, which may receive spoken information from a user and convert it to usable digital information. Audio codec 360 may likewise generate audible sound for a user, such as through a speaker, e.g., in a handset of computing device 350. Such sound may include sound from voice telephone calls, may include recorded sound (e.g., voice messages, music files, etc.) and may also include sound generated by applications operating on computing device 350.

The computing device 350 may be implemented in a number of different forms, as shown in the figure. For example, it may be implemented as a smartphone 382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing a physical structure including a plurality of light sources, each light source being disposed on the structure and being configured to illuminate a target area in proximity to the structure;
controlling illumination of the plurality of light sources in a sequence over a first time period, wherein at a given point in time in the sequence, one or more of the plurality of light sources are powered to enable illumination of the target area by powered ones of the plurality of light sources;
capturing images of the target area over the first time period, each image being captured using a single reference location in the target area, each image being of a target object that is located in the target area at each point in time in the sequence, the capturing of each different image using a different combination of light sources in the sequence;
evaluating, using the single reference location, the captured images including processing the captured images on a pixel by pixel basis to produce a single composite image having respective pixel values derived from the evaluated captured images;
3D scanning the target object to determine height information for a surface of a target on the target area for one or more pixels associated with the composite image;
using the height information to flatten respective pixels of the composite image; and
providing, as an output, the composite image after the flattening of the respective pixels.

2. The method of claim 1 further comprising calibrating the illumination including backing out discontinuities in lighting of the target area.

3. The method of claim 2 wherein evaluating the captured images includes normalizing each captured image with respect to the calibrating prior to further processing.

4. The method of claim 1 further comprising inserting a page into the target area, the page representing the target object.

5. The method of claim 4 wherein the page is included in an album and wherein inserting includes inserting the album turned to the page.

6. The method of claim 1 wherein the plurality of light sources include four or more spatially separated light sources.

7. The method of claim 1 wherein evaluating the captured images includes evaluating for each pixel each captured image, determining one or more pixel values from the captured images to use in the composite image and determining a composite image pixel value for a respective pixel based on the determined one or more pixel values.

8. The method of claim 7 wherein evaluating includes for each pixel, filtering out a portion of the pixel values for one or more of the captured images and not using the filtered out portion in computing the determined composite image pixel value.

9. The method of claim 8 wherein filtering out includes filtering out one or more lightest and one or more darkest pixel values.

10. The method of claim 9 wherein evaluating includes applying a mathematical function to remaining pixel values from captured images not included in the filtered out portion.

11. The method of claim 10 wherein the mathematical function is selected from the group comprising a mathematical mean or median.

12. The method of claim 1 wherein 3D scanning includes determining a point cloud associated with the target area including height information and defining a Bezier curve to define a surface associated with the target area, and using the defined surface to develop the height information.

13. The method of claim 1 wherein the structure is portable.

14. The method of claim 1 wherein evaluating the captured images includes applying a filter to each captured image.

15. A computer program product embodied in a non-transitive computer-readable medium including instructions, that when executed, cause one or more processors to:
control illumination of a plurality of light sources disposed on a physical structure and configured to illuminate a target area in proximity to the structure, the illumination of the plurality of light sources controlled in a sequence over a first time period, wherein at a given point in time in the sequence, one or more of the plurality of light sources are powered to enable illumination of the target area by powered ones of the plurality of light sources;

capture images of the target area over the first time period, each image being captured using a single reference location in the target area, each image being of a target object that is located in the target area at each point in time in the sequence, the capturing of each different image using a different combination of light sources in the sequence;

evaluate, using the single reference location, the captured images including processing the captured images on a pixel by pixel basis to produce a single composite image having respective pixel values derived from the evaluated captured images;

3D scan the target object to determine height information for a surface of a target on the target area for one or more pixels associated with the composite image;

use the height information to flatten respective pixels of the composite image; and provide, as an output, the composite image after the flattening of the respective pixels.

16. The computer program product of claim 15 further comprising calibrating the illumination including backing out discontinuities in lighting of the target area.

17. The computer program product of claim 15 further comprising inserting a page into the target area, the page representing the target object.

18. The computer program product of claim 17 wherein the page is included in an album and wherein inserting includes inserting the album turned to the page.

19. A system comprising:
a physical structure that includes a plurality of light sources, each light source being disposed on the structure and being configured to illuminate a target area in proximity to the structure;
one or more processors for controlling the structure; and
one or more memory elements including instructions that, when executed, cause the one or more processors to:
control illumination of the plurality of light sources in a sequence over a first time period, wherein at a given point in time in the sequence, one or more of the plurality of light sources are powered to enable illumination of the target area by powered ones of the plurality of light sources;
capture, by a camera disposed on the physical structure, images of the target area over the first time period, each image being captured using a single reference location in the target area, each image being of a target object that is located in the target area at each point in time in the sequence, the capturing of each different image using a different combination of light sources in the sequence;
evaluate, using the single reference location, the captured images including processing the captured images on a pixel by pixel basis to produce a single composite image having respective pixel values derived from the evaluated captured images;
3D scan the target object to determine height information for a surface of a target on the target area for one or more pixels associated with the composite image;
use the height information to flatten respective pixels of the composite image; and
provide, as an output, the composite image after the flattening of the respective pixels.

20. The system of claim 19 further comprising calibrating the illumination including backing out discontinuities in lighting of the target area.

21. The system of claim 19 further comprising inserting a page into the target area, the page representing the target object.

22. A computer-implemented method comprising:
providing a structure including a plurality of light sources, each light source being disposed on the structure and being configured to illuminate a target area in proximity to the structure;
capturing one or more calibration images of the target area including illuminating the target area with one or more of the plurality of light sources and capturing the one or more calibration images coincident with the illuminating;
receiving an indication that a target item has been placed in the target area and thereafter controlling illumination of the plurality of light sources in a sequence over a first time period, wherein at a given point in time in the sequence, one or more of the plurality of light sources are powered to enable illumination of the target area by powered ones of the plurality of light sources;
capturing images of the target area over the first time period, each image being captured using a single reference location in the target area, each image being of a target object that is located in the target area at each point in time in the sequence, the capturing of each different image using a different combination of light sources in the sequence;
calibrating one or more of the captured images including backing out discontinuities in lighting of the target area;
evaluating, using the single reference location, the captured images including processing the captured images on a pixel by pixel basis to produce a single composite image having respective pixel values derived from the evaluated captured images; and
providing, as an output, the composite image.

23. The method of claim 22 wherein backing out discontinuities includes multiplying each captured image by a normalization image based on the corresponding calibration image.

24. The method of claim 22 wherein the normalization image is created by dividing each pixel value of the calibration image by the calibration image's maximum pixel value.

25. The method of claim 24 wherein the maximum pixel value is evaluated based on luminosity.

26. A system comprising:
a physical enclosure including a plurality of light sources, each light source being disposed on the structure and being configured to illuminate a target area in proximity to the structure, the physical enclosure including a frame and a screening cloak, the screening cloak including a port for enabling capture of an image by a camera disposed on the structure at the port;
a controller for providing power and control for the plurality of light sources; and
an application for receiving an indication that a target item has been placed in the target area and thereafter controlling illumination of the plurality of light sources in a sequence over a first time period, wherein at a given point in time in the sequence, one or more of the plurality of light sources are powered to enable illumination of the target area by powered ones of the plurality of light sources;

the application being further configured to:

capture images of the target area over the first time period, each image being captured using a single reference location in the target area, each image being of a target object that is located in the target area at each point in time in the sequence, the capturing of each different image using a different combination of light sources in the sequence, evaluate, using the single reference location, the captured images including processing the captured images on a pixel by pixel basis to produce a single composite image having respective pixel values derived from the evaluated captured images, and provide as an output, the composite image.

27. The system of claim 26 wherein the screening cloak is configured to extend over the frame to a base location so as to block ambient light from illuminating the target area.

28. The system of claim 26 wherein the frame includes adjustable height legs for adjusting a height of the port over the target area.

29. The system of claim 26 wherein the frame is sized to receive a single page of a photo album in the targeting area.

30. The system of claim 26 wherein the frame is sized to receive an entire photo album but only illuminates and captures images one page at a time.

31. The system of claim 26 wherein the application executes in part on a mobile device that is separate from the physical enclosure and controller.

32. The system of claim 31 wherein the screening cloak includes a pad for positioning the mobile device to enable image capture through the port.

* * * * *

UNITED STATES PATENT AND TRADEMARK OFFICE
CERTIFICATE OF CORRECTION

PATENT NO. : 9,563,957 B1
APPLICATION NO. : 14/791087
DATED : February 7, 2017
INVENTOR(S) : Andrew Chung-Kay Choi It is certified that error appears in the above-identified patent and that said Letters Patent is hereby corrected as shown below:

In the Claims

Column 18, Lines 63-64, Claim 15: replace "non-transitive" with --non-transitory--, therefor.

Signed and Sealed this
Second Day of May, 2017

Michelle K. Lee
*Director of the United States Patent and Trademark Office*